Dec. 20, 1955  A. FISCHER  2,727,542
WOOD SHREDDING MACHINES
Filed Dec. 30, 1952  14 Sheets-Sheet 1

INVENTOR
Albert Fischer

Dec. 20, 1955   A. FISCHER   2,727,542
WOOD SHREDDING MACHINES
Filed Dec. 30, 1952   14 Sheets-Sheet 2

INVENTOR
Albert Fischer

INVENTOR
Albert Fischer

Dec. 20, 1955  A. FISCHER  2,727,542
WOOD SHREDDING MACHINES
Filed Dec. 30, 1952  14 Sheets-Sheet 5

INVENTOR
Albert Fischer

Dec. 20, 1955 A. FISCHER 2,727,542
WOOD SHREDDING MACHINES
Filed Dec. 30, 1952 14 Sheets-Sheet 6

INVENTOR
Albert Fischer

Dec. 20, 1955  A. FISCHER  2,727,542
WOOD SHREDDING MACHINES
Filed Dec. 30, 1952  14 Sheets-Sheet 8

INVENTOR
Albert Fischer

Dec. 20, 1955      A. FISCHER      2,727,542
WOOD SHREDDING MACHINES
Filed Dec. 30, 1952      14 Sheets-Sheet 9
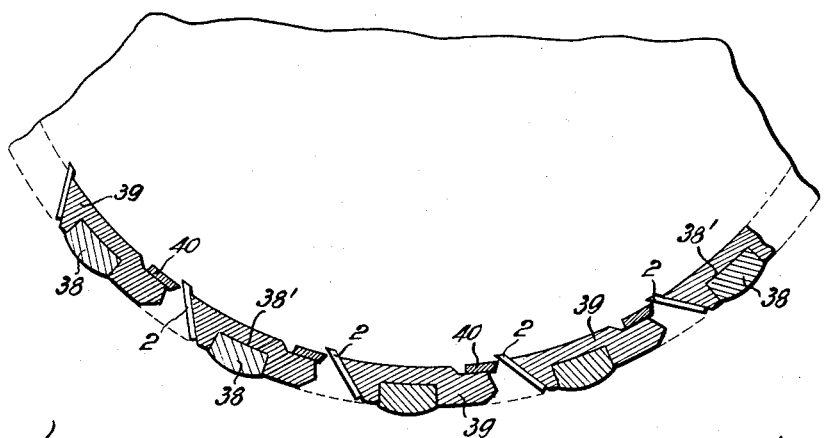
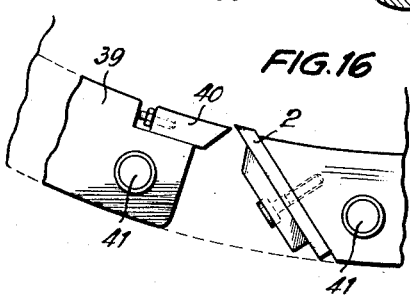 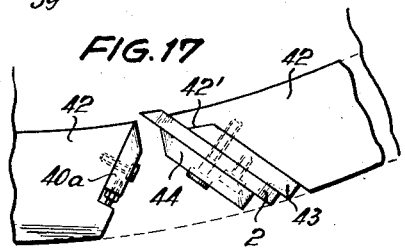
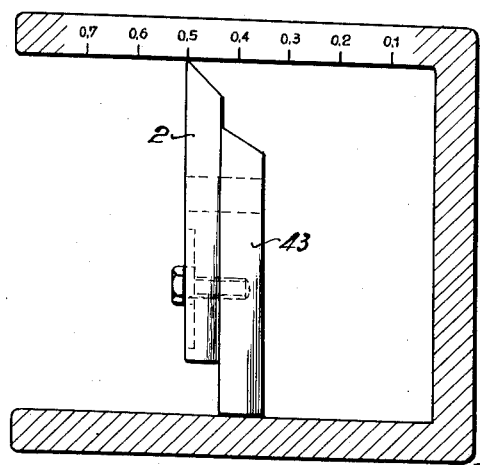
INVENTOR
Albert Fischer Dec. 20, 1955  A. FISCHER  2,727,542
WOOD SHREDDING MACHINES
Filed Dec. 30, 1952  14 Sheets-Sheet 10

INVENTOR
Albert Fischer

Dec. 20, 1955  A. FISCHER  2,727,542
WOOD SHREDDING MACHINES
Filed Dec. 30, 1952  14 Sheets-Sheet 12

INVENTOR
Albert Fischer

Dec. 20, 1955  A. FISCHER  2,727,542
WOOD SHREDDING MACHINES
Filed Dec. 30, 1952  14 Sheets-Sheet 13
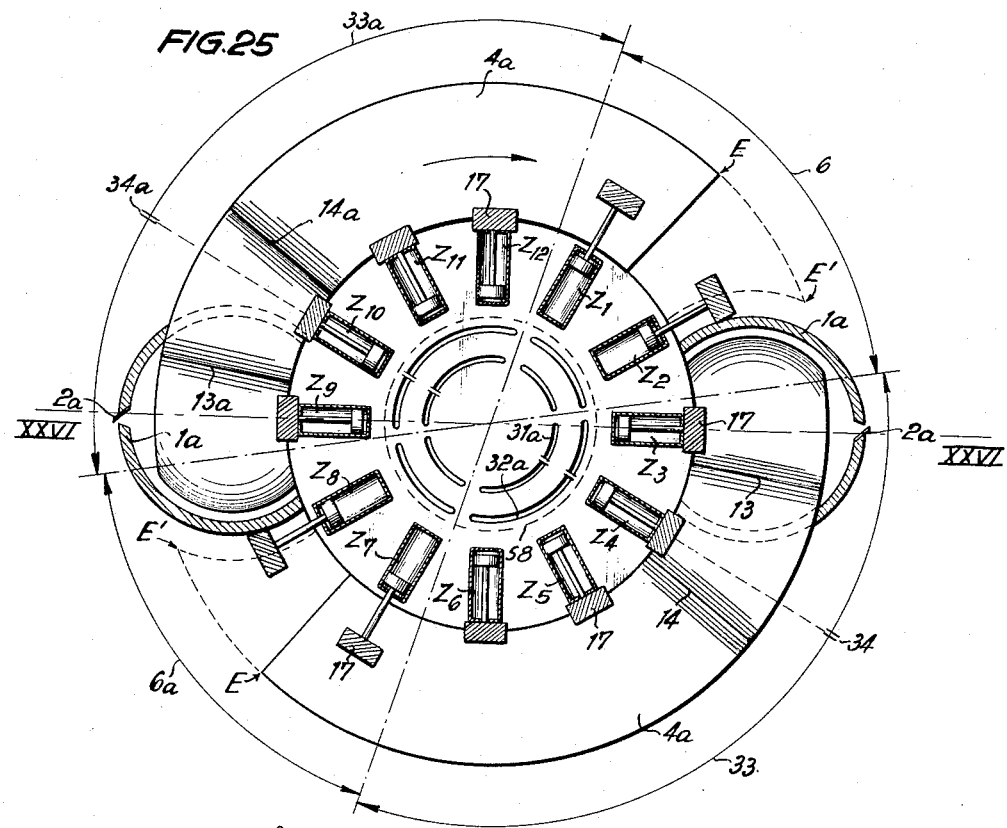
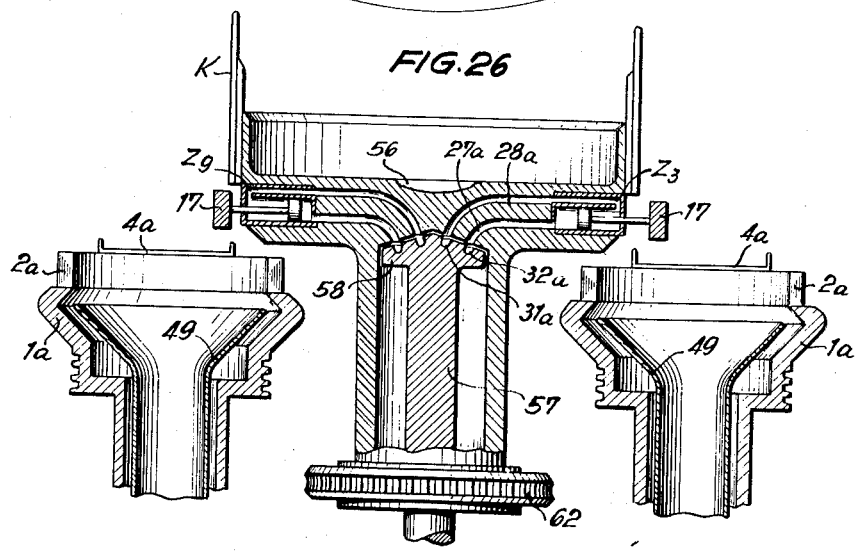
INVENTOR
Albert Fischer Dec. 20, 1955    A. FISCHER    2,727,542
WOOD SHREDDING MACHINES
Filed Dec. 30, 1952    14 Sheets-Sheet 14
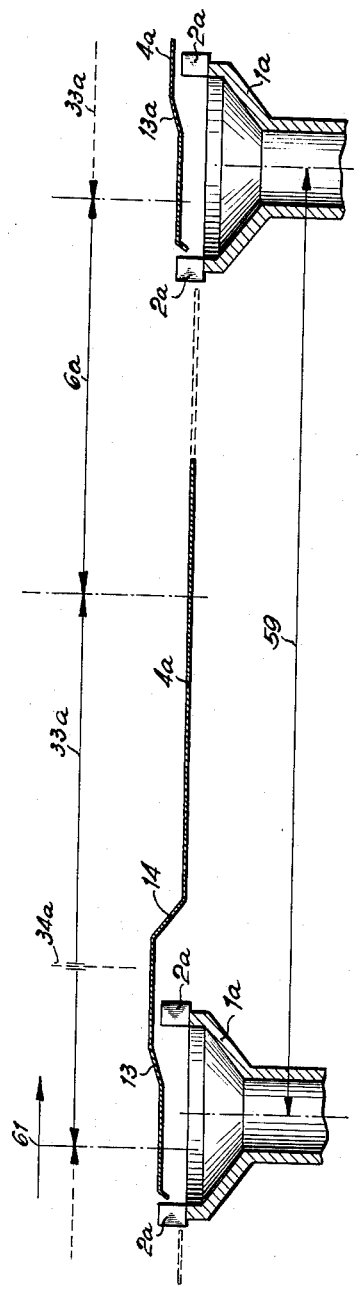
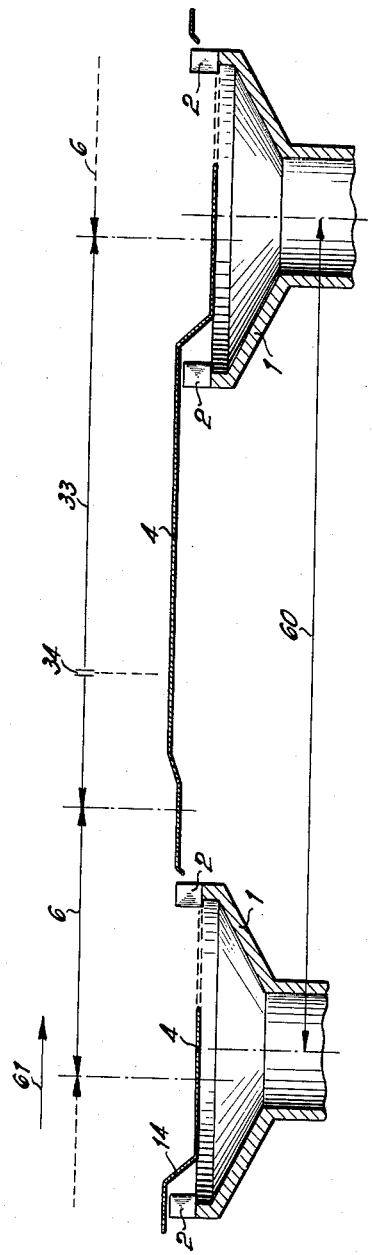
INVENTOR
Albert Fischer

United States Patent Office 2,727,542
Patented Dec. 20, 1955

2,727,542
WOOD SHREDDING MACHINES

Albert Fischer, Wendlingen am Neckar, Germany, assignor, by mesne assignments, to Allwood Incorporated, Glarus, Switzerland, a corporation of Switzerland Application December 30, 1952, Serial No. 328,601

Claims priority, application Germany December 31, 1951

16 Claims. (Cl. 144—176)

My invention relates to rotary machines for reducing wood by cutting tools into shavings, chips, shreds, small-size foils, veneer-like scales or other small particles.

There is a demand for machines in which low-grade wood or residual pieces of wood, such as logs, round bolts, cores, flitches, bark-side planks, spalts, edging and trimming, or split-offs, can be reduced to shreds, shavings, chips, scales, midget veneers or the like small particles for packing or covering purposes, for agricultural use or as bedding in husbandry, for the production of wall boards, insulating boards or similar wood composition products, and for various other applications. Different types of disintegrating machines have been proposed for producing the desired shapes and sizes of wood particles. Machines with rotating knives are usually preferred for avoiding the idling periods of periodically operating machines. However, a rotating wood shredding machine is superior only if the supply of the wood is also continuous.

It is an object of my invention to devise wood disintegrating machines with rotary cutting tools that afford a continuous wood supply in a better and more reliable manner than heretofore realized and that, if desired, are also well suitable for large-scale production of sliced, peeled, shredded or otherwise cuttingly severed particles satisfying the requirement for accurate or uniform particle shapes and sizes as needed for some applications.

Another object of my invention is to provide a disintegrating machine of the just-mentioned type that operates also as a separator for sorting the desired particle product from any residual pieces of wood stock or other waste.

Still another object of the invention is to design a rotary disintegrating machine in such a manner that it affords a continuous operation for any desired length of time although its individual tool units may have to be temporarily stopped for replacement or re-grinding of the cutting knives.

To achieve these objects, and in accordance with my invention, I design a wood disintegrating machine (hereinafter briefly called "shredding machine" regardless of the particular shape and size of the particles to be produced by a peeling, slicing, shaving or similar cutting action) in the following manner.

According to one of the features of my invention, I provide a knife-carrying tool rotor designed, for instance, as a generally cup-shaped disc with a horizontal disc plane, which is rotatable about a vertical axis and carries the knives along its periphery with the cutting edges directed upwardly, that is, vertically or somewhat inclined to the vertical. In conjunction with such a tool rotor, I provide a magazine that is rotatable about a vertical axis and has peripherally sequential compartments for the reception of the wood to be disintegrated; and I dispose the magazine above the tool rotor in eccentric relation to the rotor axis so that the knives of the rotor pass through the bottom space of each magazine compartment and cut along the bottom ends of any wood material stocked therein, while that compartment is passing through a given range (tool range) of magazine rotation.

According to another feature of my invention, the magazine compartments form together a ring-shaped group, and each compartment is composed essentially of two radial side walls and one peripheral wall, thus being open at the bottom as well as at the top and at one peripheral side. These compartments, as a rule, are vertically high to be charged from the open peripheral side with logs, flitches, bark-side boards, spalts or similar pieces of wood or wood waste that, if necessary, may be cut to the proper length or may be fastened together into bunches. The stock, when placed into the magazine compartments, usually stands upright so that its grain direction is vertical.

According to a further feature of my invention, I dispose beneath the rotary magazine a stationary slide ring extending concentrically to the magazine over the radial width of the compartments so that the horizontal top surface of the ring forms a stationary slide way which serves as a bottom for each movable compartment. Outside of the tool range, the top surface of the slide ring lies at a height slightly above the top points of the knives; but within the tool range, or rather within the knife circle of the tool rotor, the slide ring has a downwardly slanting ramp portion so that the wood stock in the rotating magazine, after being guided over the knife circle at one peripheral side of the tool rotor, will slide downwardly on the ramp to the position needed for the knives to cut into the lower ends of the stock as the stock passes through the opposite peripheral side of the knife circle. At the cutting place, the slide ring is interrupted closely ahead of the knives, and it continues closely behind the knife circle at a somewhat higher point corresponding to the vertical length of material sliced off the stock.

The shredding, therefore, takes place at the bottom of the stock, and the shreds are sliced off transversely to the direction of fiber growth of the stock. The shreds have all substantially the same rectangular cross section of the same thickness and, since they are cross grained, tend to disintegrate into more or less narrow chips or strip-shaped shavings of elongated shape and a longitudinal grain direction. If desired, a mechanical treatment may be applied to obtain such longitudinally grained particles or scales from the originally cross-grained shreds.

Since the cut-off length is not quite equal to the vertical distance which the stock must be lifted for freely passing over the non-cutting peripheral portion of the knife circle next to operate, the slide ring slants somewhat upwardly in the ring portion outside the tool range or is provided with a small upward ramp located ahead of the knife circle in the direction of magazine rotation. The magazine compartments are filled or replenished with wood along a sector area of the slide ring also located outside the tool range.

According to still another feature of my invention, I provide the rotary magazine with clamping devices for securely fastening the inserted stock in each compartment as that compartment is passing through the sectorial range of the shredding operation proper; and I control these clamping devices in dependence upon the magazine rotation so as to release the stock for lifting or lowering when each compartment travels outside of the shredding sector.

It is also a feature of my invention to provide a machine, generally as described above, with two or more tool rotors, spaced from each other peripherally along the circle of rotation of a single multi-compartment magazine, and to equip such a plural-rotor machine with a single slide ring concentric to the magazine. The slide ring has a plurality of the above-mentioned ramp portions, one within each knife circle of the set of rotors, The foregoing and other objects, advantages and features of my invention will be apparent from, and will be referred to in, the following description in conjunction with the wood shredding machines according to the invention exemplified by the drawings.

Figs. 1 to 4 relate to a first embodiment and show schematically in Fig. 1 a plan view, in Fig. 2 a section parallel to the axis of the tool rotor and the slide ring cut open and represented in developed form, in Fig. 3 a plan view of the magazine and clamping devices in conjunction therewith, and in Fig. 4 a part-sectional elevation on the line IV—IV in Fig. 3.

Fig. 6 being a partly sectional view on the line VI—VI in Fig. 5.

Fig. 15 is a horizontal section of part of an interiorly-operating tool rotor applicable in machines otherwise similar to those of the other figures; Fig. 16 is a partial top view of the same rotor, while Fig. 17 is a similar top view of a modified rotor, and Fig. 18 shows an adjusting gauge useful for setting the knives of such tool rotors to the proper cutting depth.

Fig. 25 is a schematic plan view and Fig. 26 a schematic vertical and axial section on the line XXVI—XXVI in Fig. 25 of another machine equipped with two interiorly-cutting tool rotors.

Figs. 27 and 28 are explanatory and represent diagrammatically the sequence of functions performed by machines with interiorly and exteriorly-operating tool rotors respectively.

To facilitate comparing the embodiments and for obviating unnecessary duplications in the description, the same reference numerals are applied in the different illustrations to respective functionally similar elements.

Figure 1:
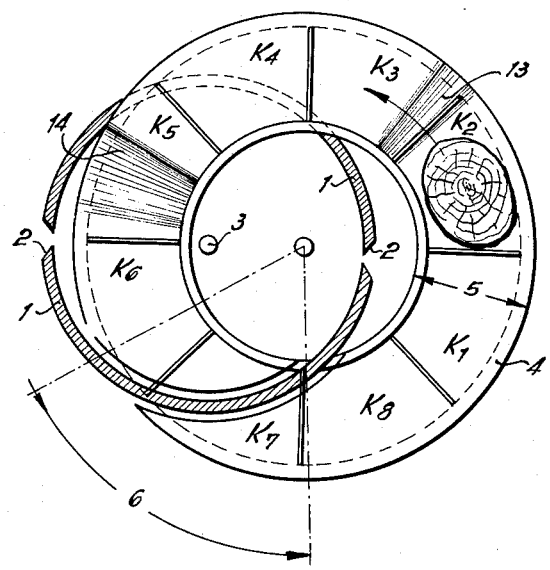
Figure 2:
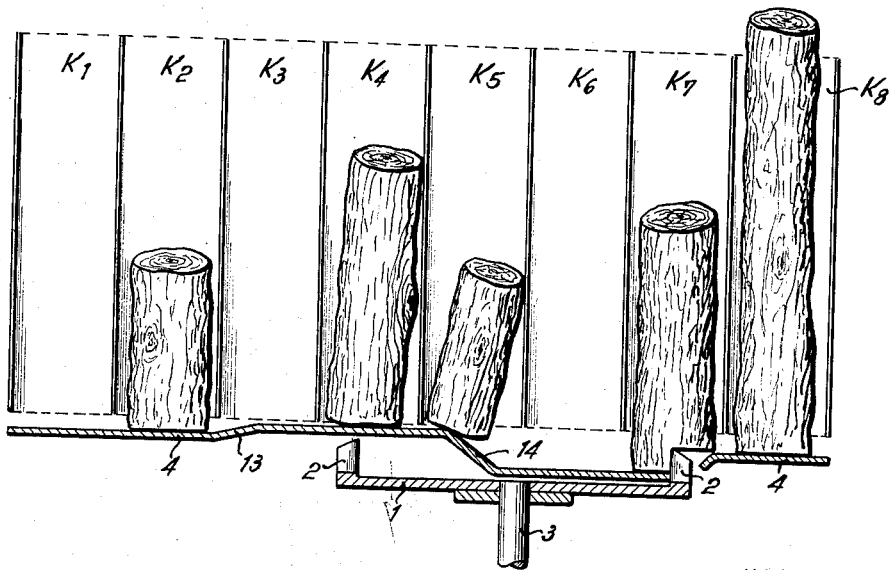

According to Figs. 1 and 2, a tool rotor designed as an upwardly open cup disc 1 with a horizontal disc plane is equipped with inwardly acting knives 2 whose edges run parallel to the axis of a vertical drive shaft 3 connected with the disc. A stationary ring-shaped slide-way structure (slide ring) 4 of a width 5 is disposed above the cup disc in eccentric relation thereto. A multi-chambered carrousel or turntable magazine with eight compartments K1 to K8 is arranged concentrically above the slide ring 4. The compartments form together an annular group. Each compartment has an inner peripheral rear wall and two radial side walls. Hence the compartments are open at the top, at the bottom, and at the outer periphery. They are rather long in the vertical direction to receive logs or other long stock that may be charged into the compartments from the outer peripheral side or from above. Assume that the magazine is at rest in the illustrated position, then the compartments K1 to K4 are available for charging or replenishing the wood stock, but this is actually done at the illustrated places of these four compartments while the magazine carrousel is rotating during the machine operation. Within the range of the ring sector, the slide ring 4 lies in a horizontal plane that passes over the knives 2, a small upward step or ramp 13 being preferably provided at a place apparent in Fig. 2 beneath compartments K2 and K3. Thence the ring 4 extends mainly beneath the compartment K4 over and beyond the left side of the knife circle toward the interior of the cup disc 1 where the ring has a downward step or slide ramp 14 visible in Figs. 1 and 2 beneath the compartment K5. The slide ring continues closely above the plane surface of the cup disc below the compartments K6 and K7 and terminates in front of the edges of the knives 2 on the right side of the knife circle. That is, the ring 4 is cut open over its entire width on a circular arc concentric to shaft 3, as is apparent from Fig. 1. Below the compartment K7 or K8, the ring 4 again commences behind the knife circle with a circular edge also concentric to shaft 3. At that place, the ring 4 has a height corresponding to the cut-off length (height) of the stock passing over the knives (Fig. 2).

The machine may be equipped with conventional means for driving the tool rotor and the magazine, for handling and supplying the wood stock, for discharging the shavings, or the like. It may be applied (without clamping devices of the kind described below) for the disintegration of pieces of stock of such a width and thickness, or of such a diameter, that a single piece can be placed into an individual compartment, if the revolving sense of the cup disc is such that the individual wood pieces are pressed against the back wall or an inner corner of the compartment under the cutting pressure of the knives. Then, in a machine as shown in Fig. 1, the cup disc and the magazine must revolve in the same directions, and the knives 2 must be set at a reversed angle as compared with the illustrated position.

However, for the continuous production of shavings of accurate shape and size, as well as for minimizing trouble during shredding, particularly when fabricating wood stock placed into the compartments in form of bunches, it is preferable and in certain cases indispensable to securely hold the wood stock during the reducing performance. According to the invention, this is effected by means of pressure devices which are arranged in front and close to the lowermost ends of the respective compartments and which rotate together with the magazine. During the shredding operation, the pressure devices force the wood stock in the individual compartment against the rear wall of the compartment or against an abutment or corner at the rear wall. The pressure devices may also be located behind each compartment and may force the wood stock against abutments that rotate together with the magazine and are located in front of each compartment.

After the termination of each cutting pass, that is after each compartment has passed through the shredding sector of the magazine revolution denoted in Fig. 1 by the arcuate arrow 6, the clamping pressure is relieved so that the wood stock can follow the upward and downward movements caused by the ramps or inclines on the surface of the slide ring 4.

The pressure or clamping devices may have movable, spring-biased buffers connected with slide pieces by links that are preferably also resilient. The slide pieces are guided by rails whose arrangement departs from the circle of magazine rotation in such a manner that the pressure plungers or buffers are forced against the wood stock and clamp the stock before the compartment enters into the shredding sector (arrow 6). However, according to a preferred embodiment, the machine is equipped with hydraulically controlled clamping devices. Such devices and their operation are described presently with reference to Fig. 3.

Figure 3:
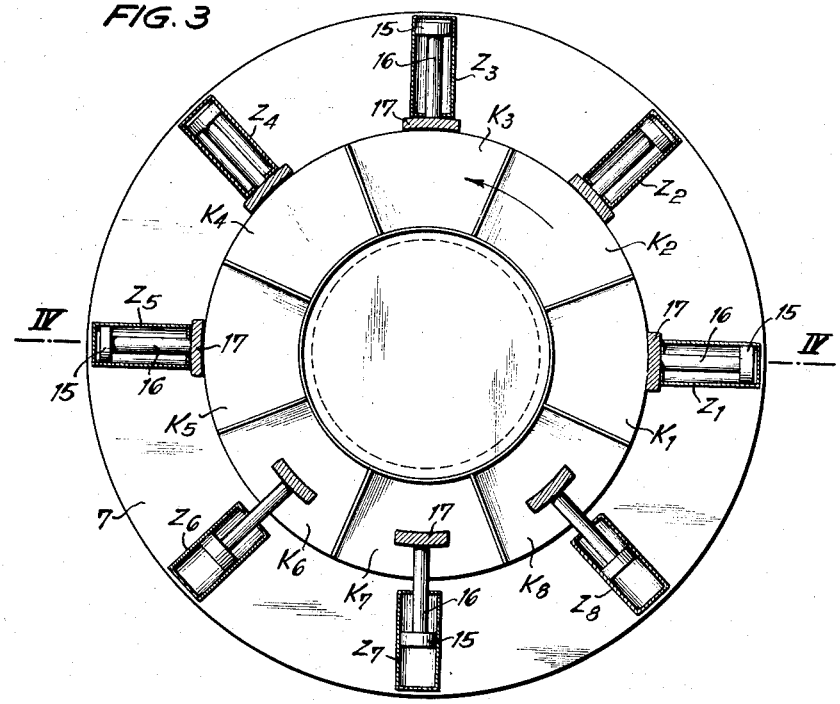

According to Fig. 3, a ring-shaped plate 7 extends horizontally at the height of the lower ends of the compartments. Plate 7 is firmly connected with the magazine and revolves together therewith. Eight individual pressure cylinders Z1 to Z8 are disposed in front of the respective compartments K1 to K8 and are mounted on the ring plate 7 so that a movement of their respective pistons 15 causes a pressure plate 17, mounted on the piston rod 16, to enter into the compartment or to be withdrawn therefrom, depending upon whether fluid pressure is applied to a conduit 18 or to a conduit 19. In the illustration, the pressure cylinders Z1 to Z5 are in the releasing condition (that is, pressure is applied to their respective ducts 19), while the pressure cylinders Z6 to Z8 are in the clamping condition (that is, pressure is applied to their respective ducts 18). This corresponds approximately to the clamping and releasing requirements in a machine as shown in Fig. 1. The pressure devices are so dimensioned that the pressure plates may enter sufficiently far into the compartments even if rather thin wood bunches or logs are to be clamped. A plurality of such pressure devices may also be arranged in front of each individual compartment for joined operation.

Figure 4:
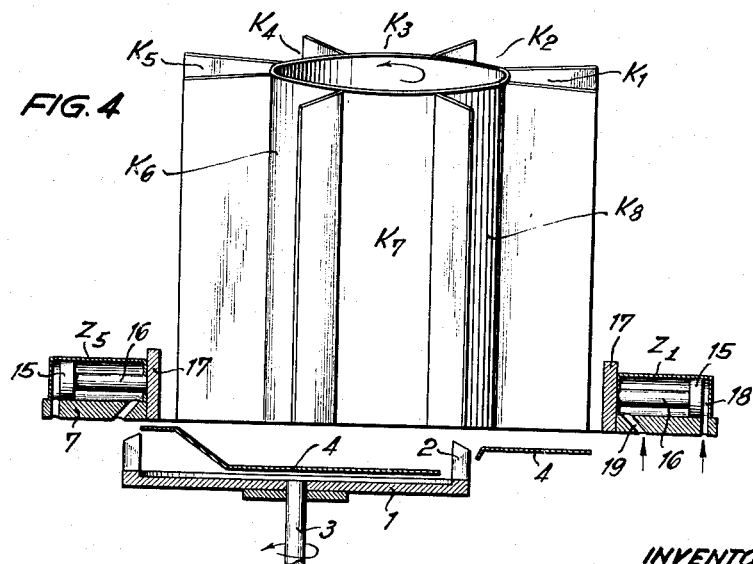
Figure 5:
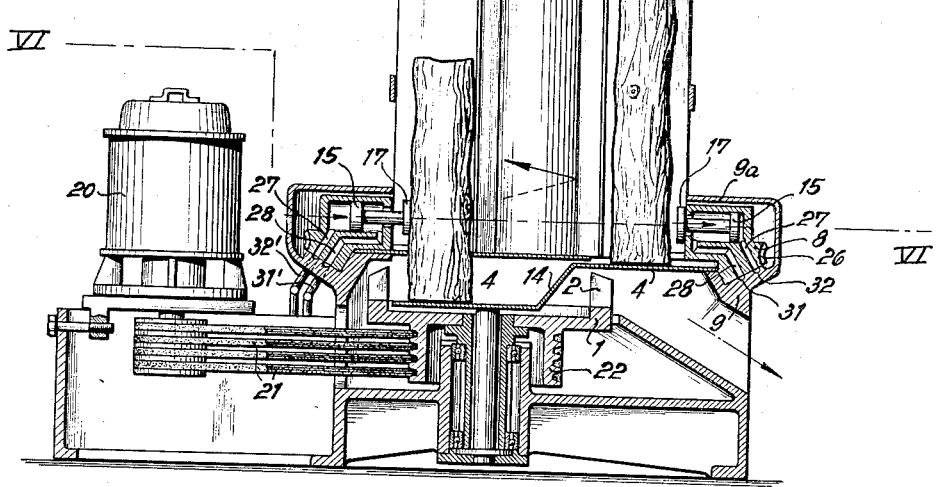
Figs. 5 and 6 illustrate, respectively, a vertical section and a part-sectional plan view of a complete machine embodying the design features of Figs. 1 to 4.
Figure 7:
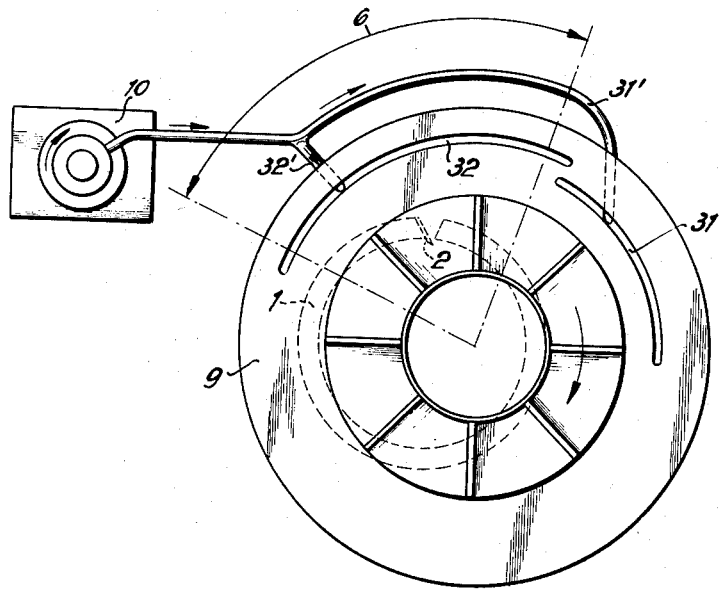
Figs. 7 and 7a are top views on parts of the machine, illustrating oil ducts in bearing blocks for hydraulic clamping devices.

Illustrated in Figs. 4 and 5 is a machine designed in accordance with the features explained in the foregoing. The machine elements already described, such as cup disc 1, slide ring 4, turntable magazine K1 to K8, and pressure cylinders Z1 to Z8, are arranged and operative in the same manner as described with reference to Figs. 1 to 4. The cup disc 1 is driven from a laterally located motor 20 by means of V-belts 21 and a sheave 22. Sheave 22 and cup disc 1 are formed as an integral casting. The magazine is driven from another motor 20' through a conventional stepless gear 23, an elastic coupling 24, a worm 25 and a worm wheel 26. The pressure cylinders Z1 to Z8 are integrated with a cylinder-supporting ring (7 in Fig. 3) into a single annular block piece 8 which also forms the worm wheel 26. The block piece 8 has two bores 27 and 28 per cylinder for supplying pressure oil for the forward and return movement respectively of the pistons 15. A bevelled peripheral face of piece 8, immediately below the worm wheel 26, is slidably seated upon a mating bevel face of an annular stationary bearing block 9. Two concentric grooves 31 and 32 are provided in the bevel face of bearing block 9. As shown in Fig. 7, these grooves, covered by the annular block piece 8, serve as supply ducts for pressure liquid, preferably oil. To this end, the grooves 31 and 32 are connecetd by the oil lines 31' and 32' with the pressure side of an oil pump 10. As illustrated in Fig. 5, taken together with Fig. 7, the duct 27 of each of the pressure cylinders communicates with the groove 32 over a rotational sector equal to the length of the said groove, whereupon the duct 28 of the pressure cylinders communicates with the groove 31 over a rotational sector equal to the length of this second groove. As a result, upon approaching the range of the tool rotor 1 for a cutting pass, the piston 15 of each pressure cylinder is moved forward under the influence of pressure exerted by oil passing from the groove 32 into the duct 27 and into the cylinder space behind the piston and, by means of the clamping device 17, the wood stock within the compartment adjacent to the cylinder in question is securely held in position during the cutting pass. Upon termination of the cutting performance, the pressure behind the piston ceases and is replaced by pressure exerted upon the piston by oil entering the cylinder in front of the piston from the groove 31 through the duct 28. The embodiment illustrated in Fig. 7 does not provide return lines for the release of oil upon reversal of the hydraulic pressure. In lieu thereof, the oil is removed from the cylinders by means of one of the two conduits 27 or 28 through which it is forced in between the two gliding surfaces of the annular pieces 8 and 9 in order to act as a lubricant there. Excessive oil collects within the circular trough provided by the ring 9 and is removed from there by means of a suitable boring to be returned by gravity to the suction side of the pump 10. As a result of pressure exerted upon the piston by oil entering the cylinder in front of the piston, the clamping pressure is released and, as explained before, the wood stock can follow the upward and downward inclines of the slide ring 4 until it is clamped again in position for the next cutting pass.

Figure 7A:
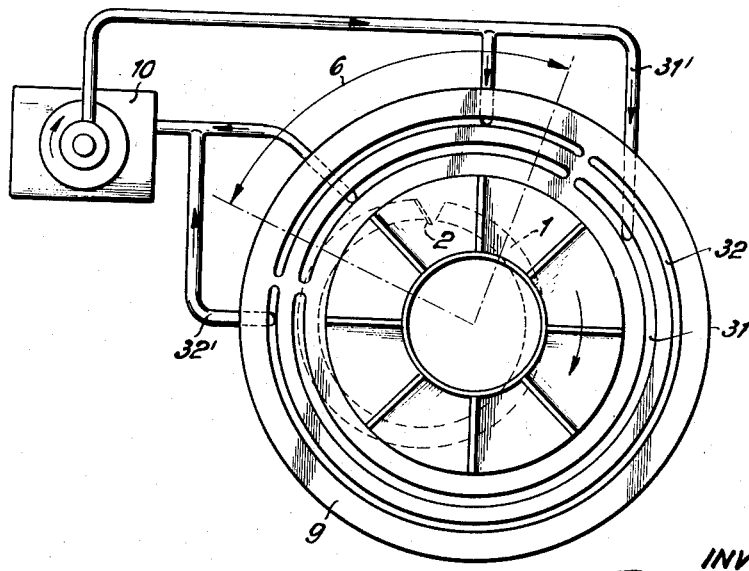

Fig. 7a illustrates another embodiment of the hydraulic clamping device. As shown in this illustration, except for two short interruptions, the grooves 31 and 32 are machined concentrically into the surface of the annular block piece 9 as complete circles and are provided not only with the pressure supply lines 31', but with the oil return lines 32' as well. According to this embodiment, during the cutting pass of one of the compartments, the wood stock thereon is clamped fast in position by means of oil pressure exerted upon the piston through oil being forced into the shorter sector of the groove ring 32. The oil pressure in front of the piston is completely released, because the shorter sector of the groove 31 is in communication with the oil return line 32'. At the same time, the longer sector of the groove 31, being outside of the range of the tool rotor 1, is under oil pressure while the longer sector of the groove 32 is in communication with the oil return line 32'. Consequently, any wood stock within compartments outside the range of the tool rotor 1 is securely relieved from any clamping pressure and is able to freely follow the up and down inclines of the slide ring 4 until it is again clamped in position for the next cutting pass. The stationary block 9 has a top portion 9a (Fig. 5) which covers the revolving annular piece 8. The top portion 9a thus provides a stationary working or loading stage around the magazine that may be walked upon, and if desired may be extended into a platform to be equipped with any desired auxiliaries for supplying and handling the stock material.

Figure 8:
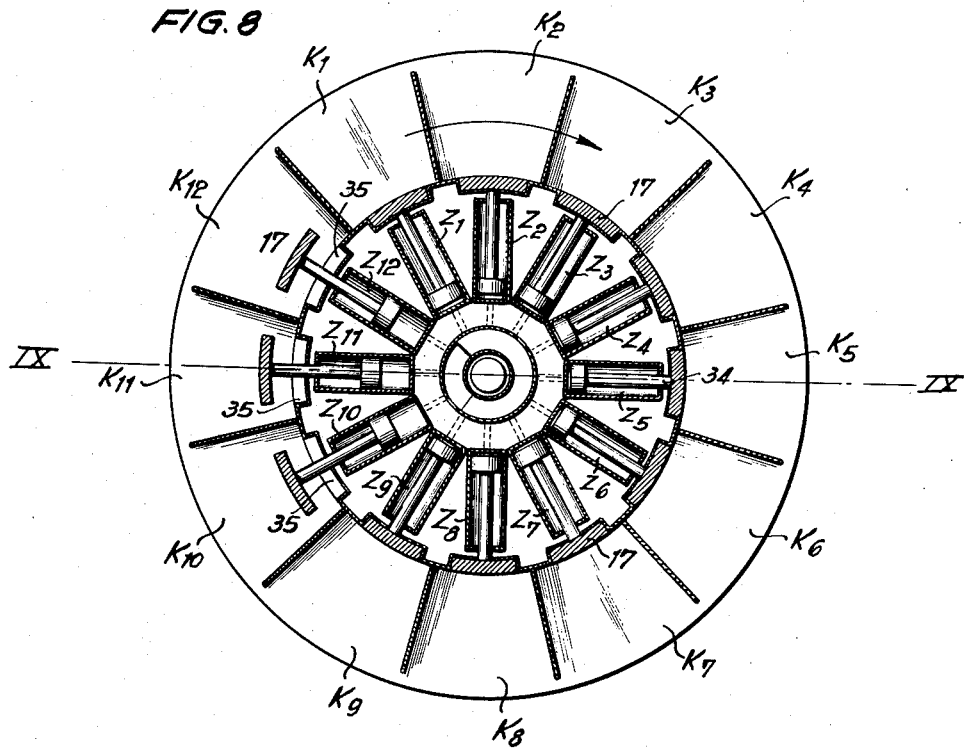
Fig. 8 shows a part-sectional plan view of a modified machine.
Figure 9:
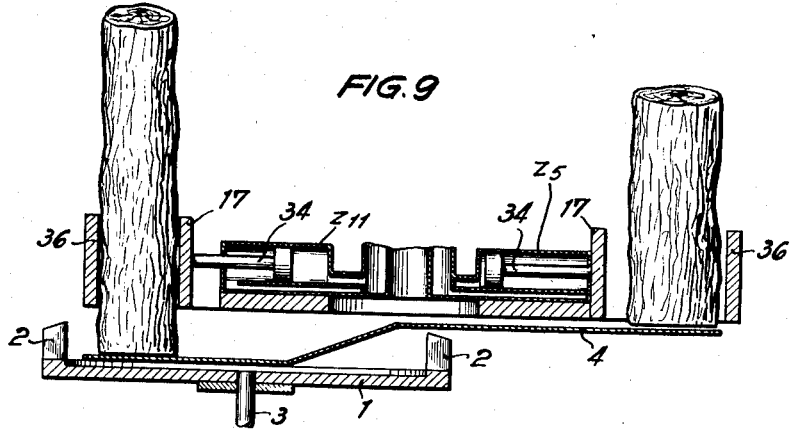
Fig. 9 is a partial and part-sectional elevation of the same machine on the line IX—IX in Fig. 8.

Schematically illustrated in Figs. 8 and 9 is a wood shredding machine in which the pressure cylinders Z1 to Z12 are arranged radially within the inner periphery of the annular group of magazine compartments. With such a cylinder arrangement, the pressure lines for clamping and releasing the pressure devices for the individual compartments are shortened since the pressure pump (for instance, a gear pump), as well as the pump motor and the pressure tank, may be built centrally into the machine. The means for distributing the pressure medium over the clamping sector beneath the compartments K10 to K12 and beneath the releasing sector (commencing below compartment K1) of the magazine can also be given a considerably simpler design. The pressure plates 17 mounted upon the piston plungers 34 of the respective cylinders enter preferably into matching recesses 35 in the rear wall of the respective compartments K1 to K12 when the plates 17 are in releasing position. During clamping, the plates press the wood stock against an abutment ring 36 located on the outer periphery of the magazine and rotating together with the magazine.

Figure 10:
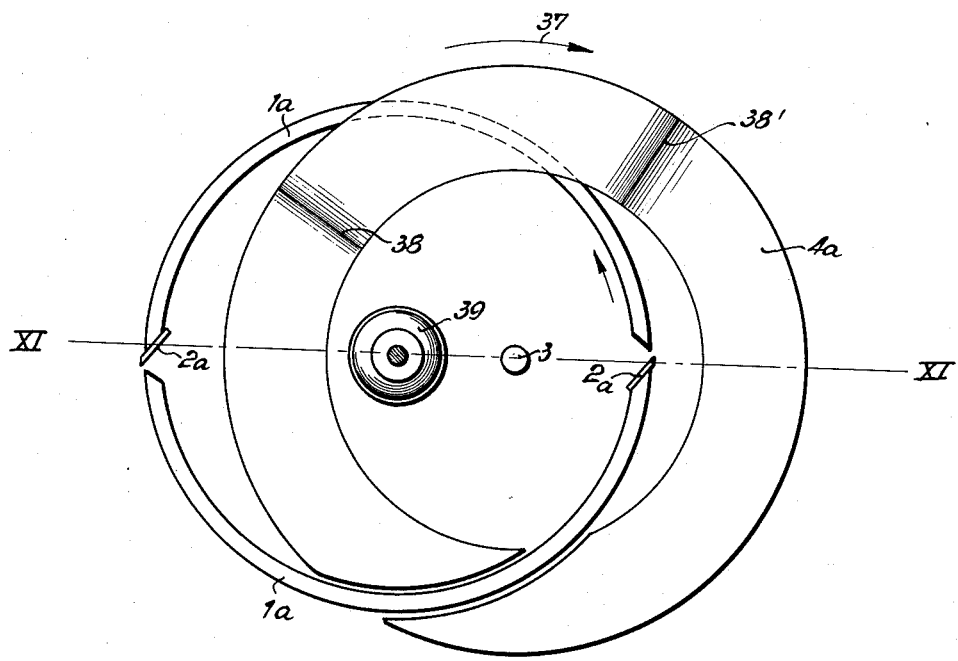
Fig. 10 is a schematic plan view and Fig. 11 a part-sectional elevation on the line XI—XI in Fig. 10, of an exteriorly-cutting tool rotor applicable in machines otherwise corresponding essentially to Figs. 1 to 4, or to Figs. 4 and 5.
Figure 11:
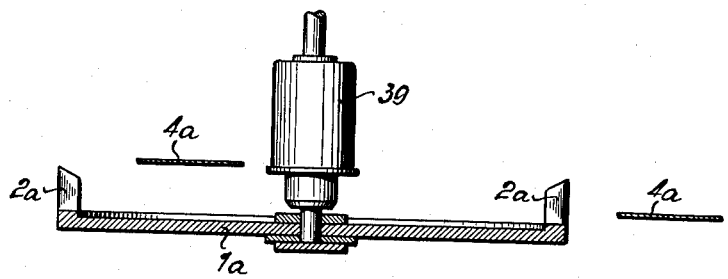

The illustrations so far described show tool rotors whose knives are arranged for the reduction of wood material fed toward the knife edges from the inside of the knife circle (so-called "interior" shredders). However, the principle of tool rotors operating with a revolving feed magazine for the wood stock according to the invention is also applicable to machines in which the knives are set for the shredding of wood stock fed from the outside toward the knife circle (so-called "exterior" shredders). Figs. 10 and 11 show schematically the tool rotor 1a of such an exterior shredder together with the stationary slide ring 4a which performs the same functions as those assigned to the slide ring 4 of the interior shredders shown in Figs. 1 to 7. For performing its purpose, the slide ring 4a for an exterior shredder is shaped, bent and interrupted as shown in Figs. 10 and 11. Since this does not require any essential change as far as the multi-chamber magazine is concerned, the magazine is not illustrated, its direction of rotation in the clockwise sense being indicated in Fig. 10 by an arrow 37.

The wood stock, placed for instance onto the portion of slide ring 4a located in Fig. 10 at the right-hand side of the knife circle, slides clockwise along the ring against the cutting knives 2a of the tool rotor. At that point, the stock is reduced by the chip length and is thereafter received by the portion of the slide ring located within the knife circle at a height corresponding to the amount of reduction. Thence, the wood stock slides over a small upward step 38 and thence passes over the portion of the knife circle opposite the shredding sector. Thereafter the stock slides downward along the step 38' back to the correct vertical position required for the cutting performance.

It is also apparent from Figs. 10 and 11 that the drive motor 39 for the tool rotor may be mounted centrally above the cup disc of the rotor, provided this is permitted by the ratio of the rotor diameter to the width of the slide ring and by the position of the slide ring relative to the rotor circle; it being understood that many variations are possible with respect to the ratio of rotor diameter to diameter and width of the slide ring, as well as regards the ratio of ring width to ring diameter, and as regards the horizontal eccentricity of the slide ring relative to the rotor circle.

The thicknes of the shavings, midget veneers or scale-shaped particles obtainable with devices according to the invention is determined by the ratio of the revolving speed of the cup disc to the revolving speed of the magazine, divided by the number of knives along the knife circle. Consequently, the desired particle thickness is well defined and readily adjustable.

It is a notable advantage that in machines according to the invention, the cylindrical wall of the tool rotor or cup disc need not be subjected to the feed pressure of the wood stock for securing a proper feed movement or for determining the thickness of the severed particles by the amount of knife setting relative to the cylinder surface. Since the correspondingly operating devices according to the invention not only feed the wood continuously but also securely hold the wood during the cutting operation, without the aid of a supporting surface formed by a rotating cylinder surface of the cup disc, the machines according to the invention eliminate the considerable friction of the wood against a rotating cylinder surface occurring in various known wood chipping apparatus. If the cup discs in machines according to the invention are equipped with a cylindric jacket ring, as may be desirable for improved strength or from other engineering viewpoints, the edge projection (setting) of the knives is preferably given such a magnitude that all desired particle thicknesses are smaller than the available maximum amount of setting in order to avoid friction on the cylinder surface. The desired particle thicknesses may then also be adjusted, changed or subsequently corrected during the operation of the machine, this being not possible with disintegrators whose peripheral surface must receive the feed pressure of the wood stock to be disintegrated.

Another advantage of shredding machines according to the invention lies in the fact that extremely long, and also if desired differently long, individual logs, pieces or bunches of material may be charged into the magazine without impairing the shredding performance.

Besides, machines according to the invention may be equipped with any conventional accessory means and devices that may be needed or desired for supplying, erecting, inserting or otherwise handling the wood stock, for removing the resulting particle material and other purposes.

While the above-described embodiments are shown to have a single tool rotor, the output of a machine unit can be greatly increased by providing two or more of such rotors to cooperate with a common magazine and a single slide-ring assembly. In such plural-rotor machines, the slide ring has as many upward and downward ramp portions and as many interruptions as the machine has rotors, and the controls for the clamping and releasing of the wood stock are also made to perform a complete cycle of operations for each of the respective tool rotors. Machines embodying these features are shown in Figs. 12 to 14 and Figs. 25 to 28 and are described in the following.

Figure 12:
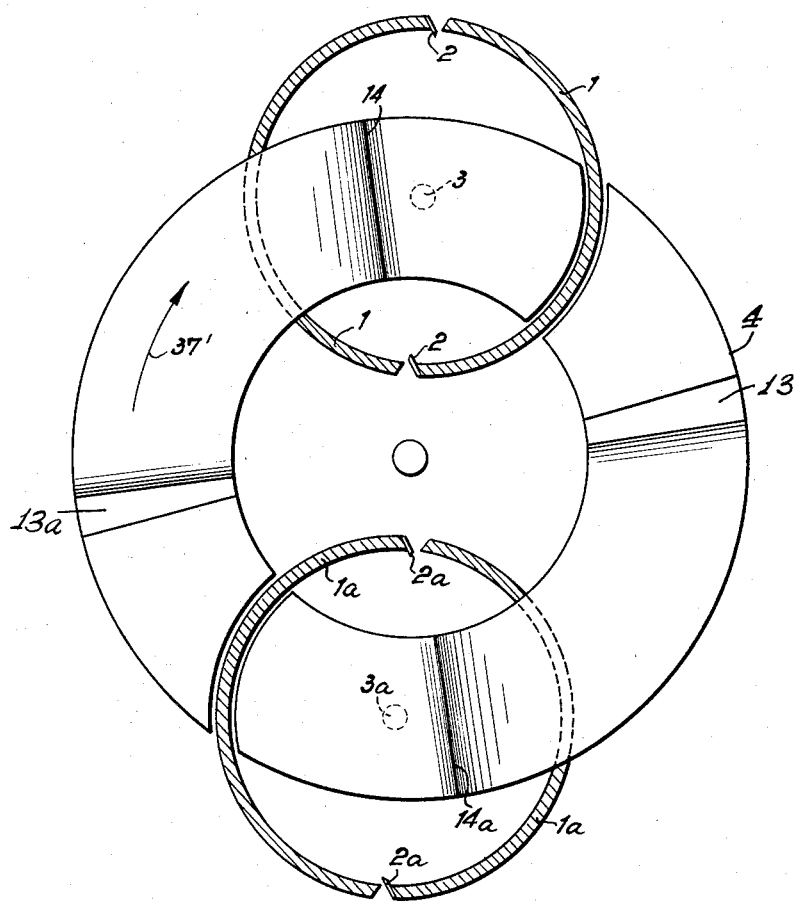
Fig. 12 is a schematic plan view of a machine with two tool rotors, only the rotors and the slide ring being illustrated.

Fig. 12 shows a top view of a shredding machine equipped with two interiorly-operating tool rotors or cup discs 1 and 1a, the rotary magazine being removed. The wood stock may be loaded into the magazine compartments, for instance, near the place of the arrow 37' that denotes the revolving direction of the magazine. At that loading place, the slide ring 4 has an elevation sufficiently high to guide the stock first over the tool rotor 1. Within the knife circle of the rotor, the stock slides along the downward step 14 an amount equal to the length of stock to be shredded. After the shredding pass, the wood stock, shortened by the inwardly projecting knives of rotor 1, is received by a portion of the slide ring 4 that extends at the height of the upper edges of the knives. Thence the wood stock moves slightly upward when passing over an incline 13 and thus gains the height necessary for passing uncut over the knives of the tool rotor 1a. Thereupon, the stock slides over a downward step 14a so that the lower end of the stock is now positioned for cutting by the knives of rotor 1a. After being cut, the stock passes onto another portion of ring 4 and thence upwardly along another incline 13a to the level of the loading place.

In a similar manner, additional tool rotors may be arranged peripherally along the slide ring, the described sequence of functions occurring during one revolution of the magazine as often as tool rotors are provided. For a given width of the slide ring 4, its diameter must be larger with an increased number of tool rotors so that several magazine compartments are always located between two tool rotors adjacent to each other along the slide ring, thus securing a trouble-free sequence of operations, namely the proper lifting and lowering of the wood stock and the subsequent shredding as well as the clamping and releasing needed for each individual shredding pass. A circular arc sufficient for accommodating about five to six magazine compartments from center to center of two successive tool rotors is satisfactory, even if a further operation, as described below, is performed between each two tool rotors.

Dual or multi-rotor machines according to the invention can be so designed that any one of the tool rotors may be stopped, for instance for knife replacement, without affecting the operation of the other rotor or rotors. To this end, and in accordance with another feature of my invention, the control means for clamping the wood stock in the compartments of the rotating magazine are equipped with selectively operable switching devices that permit keeping the wood stock in clamped condition as it travels by a stopped tool rotor so that the stock is carried over that rotor without being lowered to the cutting position. The machine shown in Figs. 13 and 14 exhibits these characteristics and is also resigned to operate as a separator for automatically eliminating from the stock any residual pieces of similar waste unsuitable for proper shredding.

Figure 13:
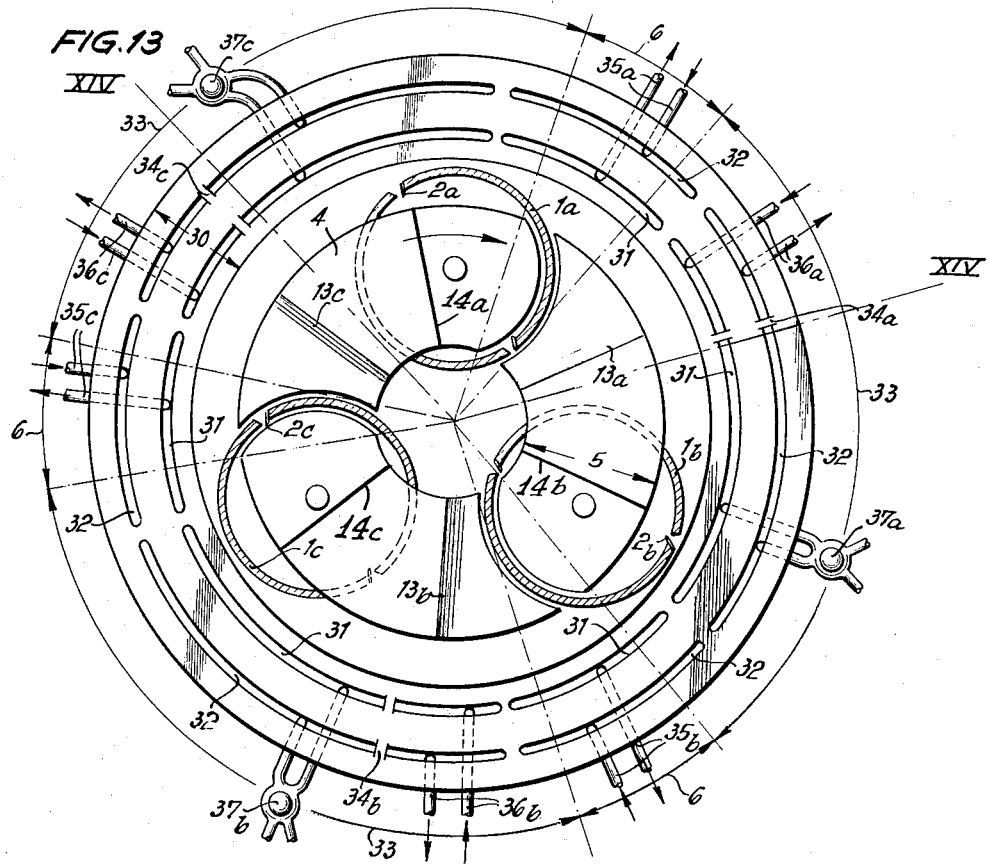
Figs. 13 and 14 illustrate a machine with three tool rotors, showing schematically in Fig. 13 a top view and in Fig. 14 a partial vertical center section on the line XIV—XIV in Fig. 13.
Figure 14:
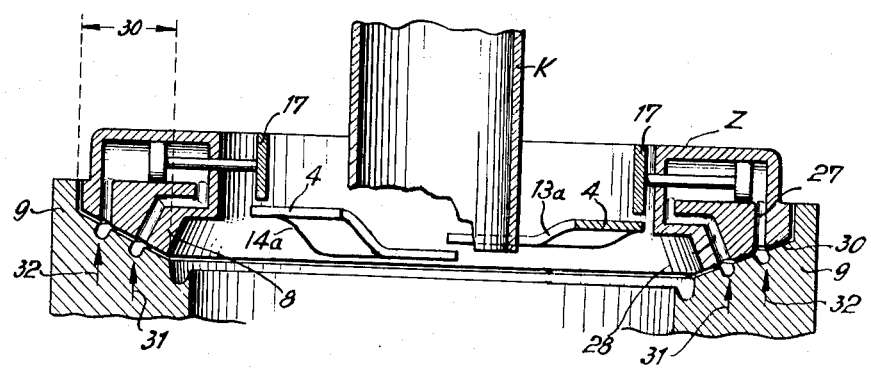

The machine according to Figs. 13 and 14 is equipped with three interiorly cutting cup-disc rotors 1a, 1b and 1c. The machine is otherwise similar to that described with reference to Figs. 3, 4 and 5. Due to the provision of three tool rotors, the circle of magazine rotation (the magazine being removed in Fig. 13) has three shredding sectors 6 and three sectors 33 intermediate the shredding sectors. In each sector 33, the stock is conveyed from one shredding operation to the next. The clamping cylinders Z are mounted on a slide block 8 firmly connected with the revolving magazine. The block 8 has an annular slide face 30 seated upon a mating face of a stationary slide bearing block 9. Block 9 has annular grooves 31 and 32. Each of these grooves is subdivided into six arcuate sections (segments) corresponding approximately to the six sectors 6 and 33. The grooves 31 and 32 serve to supply and discharge oil from the cylinders of the clamping devices in basically the same manner as explained above with reference to Figs. 5 to 7 or 7a. That is, the grooves 31 and 32 connect the oil ducts 27 and 28 of each clamping cylinder with the pressure and return side of a pump. The six subdivisions of each groove 31 and 32 (Fig. 13) are so arranged relative to the circle of magazine rotation that the wood approaching a shredding sector 6 is firmly clamped shortly prior to the beginning of an individual shredding operation and is kept clamped until shortly after the shredding pass is completed.

Of the two groove segments located in each of the three shredding sectors 6, the outer one (31) is continuously in connection with the pressure oil supply line coming from the pump, and the inner one (32) is continuously connected with the return line leading into the pump or collecting tank of the pump as explained in detail in the description referring to Fig. 7a. Consequently, the contents of each magazine compartment approaching a shredding sector 6 is clamped fast in the compartment. The nipples or tubes for connecting these groove segments to the pump are shown arranged in pairs 35a, 35b, 35c, each of these pairs consisting of a connecting tube between the groove 32 and the pressure side of an oil pump and a connecting tube between the groove 31 and the intake side of the said oil pump. In a similar manner, the clamping device of each magazine compartment leaving the shredding sector 6 and moving through the conveying range 33 is released by means of tubes connecting the longer groove segments to the pump. These nipples or tubes are shown arranged in pairs 36a, 36b and 36c, each of these pairs consisting of a connecting tube between the groove 31 and the pressure side of the said oil pump and a connecting tube between the groove 32 and the intake side of the said oil pump. Therefore, upon leaving the shredding sector 6, the clamping pressure is released and the wood stock within the respective compartment is free to follow the upward incline 13a, 13b or 13c, and the downward incline 14a, 14b or 14c of the slide plate 4.

It will be noted that in Fig. 13 the groove segments 31 and 32 are shown interrupted within each conveying range 33 at 34a, 34b and 34c, respectively. Such interruptions may be provided for securing an additional advantage described below. For obtaining the above-described triple shredding operation, including all individual operational steps as described so far, interruptions are not required.

To permit stopping each individual disintegrating tool rotor while the machine continues operating with its other rotors, the following additional devices are provided. The groove segments within the sectors 33 are each subdivided at 34a, 34b, 34c into two partial segments. The places of interruption are reached by the wood stock, sliding clockwise on the slide ring 4, after the stock is lifted along one of the upward inclines 13a, 13b or 13c. The groove segments closest to the preceding tool rotor communicate with the connecting nipples 36a, 36b or 36c, as described previously, nothing being changed with respect to the supply and discharge of the pressure medium to permit the wood stock to be lifted by the upward inclines 13a, 13b, 13c. The groove segments immediately subsequent to the interruptions 34a, 34b, 34c in the clockwise sense are provided with added connecting nipples which communicate with the reversing slide valves 37a, 37b, 37c. The actuation of the reversing valves permits switching the supply of the pressure liquid from the inner groove 31 to the outer groove 32 while simultaneously switching the discharge connection from groove 32 to groove 31. As a result, the stock, entering at 34a, 34b or 34c into the second portion of a sector 33 can selectively be clamped or released.

When the stock passes through this sector portion, and hence through the entire sector 33, without clamping, no change occurs in the machine operation previously described. That is, the clamping devices release the wood stock as it passes through the sector 33 and then clamp the stock when it passes into the shredding sector 6.

However, when the wood stock, after entering the partial sector at 34a, 34b or 34c is clamped fast, then the stock, previously lifted by one of the steps 13a, 13b or 13c, is carried in its highest position within the magazine circle over the adjacent downward step located within the knife circle of one of the tool rotors 1a, 1b or 1c. The wood stock, without being released, is then also carried over the entire shredding sector 6. Within the sector 33 next following in the clockwise direction, the sequence of normal functioning becomes again effective when the reversing valve for this sector is set to "release." The described design is advantageously used, among other things, for the temporary stopping of an individual tool rotor to permit knife replacement without stopping the shredding operation of the other tool rotors.

After a stopped tool rotor is again ready for shredding operation, it is first started and brought up to its normal running speed before the controls of the clamping devices are switched to resume their operation relative to that rotor. In this manner, all individual tool rotors of such a machine may temporarily be stopped in sequence for regrinding or replacement of its cutting knives, without interrupting the shredding operation of the other rotors. The machine may also be so operated that, referring to a three-rotor machine, only two of its rotors are continuously in operation while the third rotor is kept as a standby to be ready for operation when a knife replacement becomes necessary, thus securing a continuously uniform flow of shred material from the machine into the subsequent course of a fabricating line.

For facilitating a rapid replacement of the knives and for permitting a rapid and accurate adjustment of the cutting depth and hence of the particle thickness, as well as for separating the particles of the adjusted thickness from splintery and other waste and from any unshredded residual pieces, the tool rotors in machines according to the invention are preferably designed as explained presently with reference to Figs. 15 to 17. As shown in Fig. 15, the knife circle of the rotor is composed of segment-shaped pieces 39 which follow each other along the periphery of the rotor disc and can be upwardly withdrawn therefrom. The knives 2 are attached to the respective pieces 39. A slit for the passage of the peeled shreds of wood remains between the segment pieces 39. Mounted opposite each knife is a slide 40 for adjusting the width of the slit. Each slide 40 is peripherally displaceable by a micrometer screw. Shreds of excessive thickness and other coarse pieces of wood waste cannot pass through the slits. The segment pieces 39 are shoved from above onto the carrier parts 38 firmly connected with the cup-disc bottom or other structure of the tool rotor. The segment pieces 39 are well fitted to the carrier parts, particularly at the mating faces 38', so that it is possible to mount and adjust the knives 2 on the respective segment pieces 39 with the desired knife setting prior to inserting the segment pieces 39 onto the carrier parts.

Fig. 16 shows an individual removable segment 39 with its knife 2 and slide 40 on a larger scale and somewhat modified. In this modification, the carrier parts 38 are replaced by pins 41 firmly secured to the disc bottom or body of the tool rotor.

In Fig. 17, a cylinder ring 42 is shown firmly connected with the bottom of the cup-disc rotor. Ring 42 is provided with recesses for the passage of the shavings as well as for the reception of accurately fitted knife carriers 43 to which the knives 2 are fastened by respective cover plates 44. Also disposed in each recess is the slide 40a for adjusting the width of the slit. Each carrier 43 abuts against a stop face 42' of ring 42. When setting the total length of each carrier-knife unit to the same selected value, preferably with the aid of a gauge as shown in Fig. 18, all knife edges of the rotor are equally spaced from the rotor axis.

Figure 19:
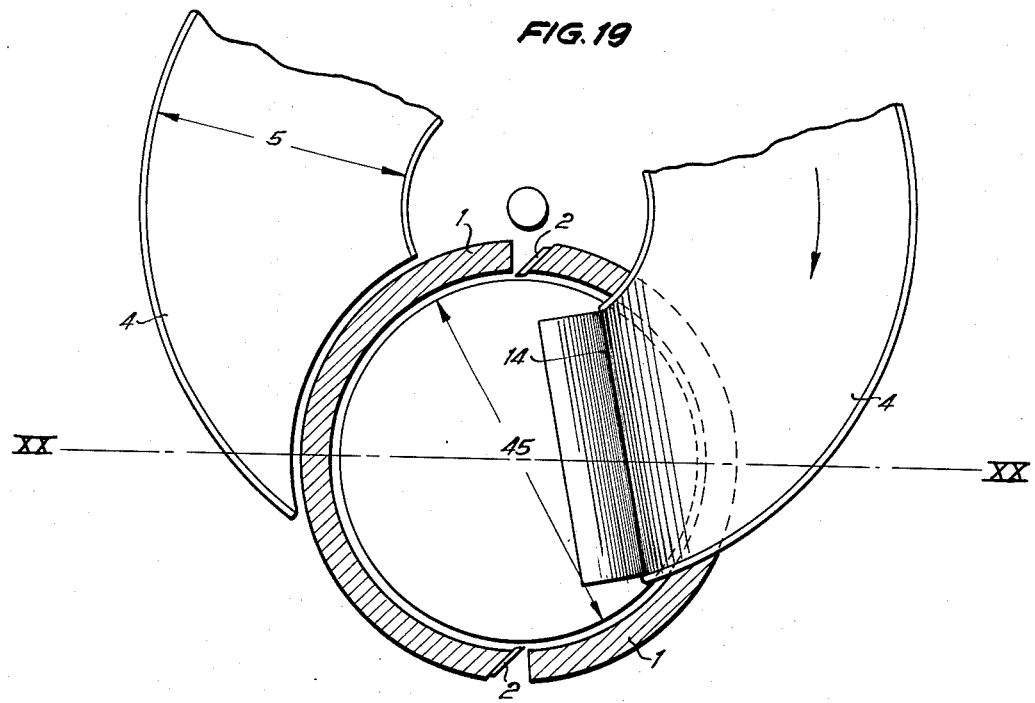
Fig. 19 is a partial plan view of another embodiment of a tool rotor with a slide ring.
Figure 20:
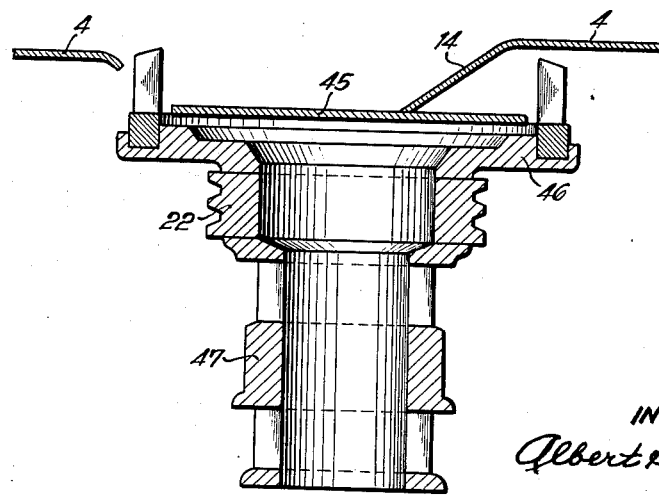
Fig. 20 shows a vertical axial section of the line XX—XX in Fig. 19

Fig. 19 shows an interiorly-cutting rotor and the modified slide ring 4 seen from above, and Fig. 20 shows an axial section of the same assembly. In this embodiment, the slide ring 4 terminates at its downward ramp 14 on a circular disc 45 which is concentric to the cup-disc rotor and reaches as closely as possible to the knives 2. The central part of the cup-disc bottom is cut out circularly. That is, this part of the cup-disc bottom is replaced by a sturdy ring 46 which is firmly joined with a likewise hollow V-belt sheave 22 and with a cylinder sleeve 47, so that the three parts 46, 22 and 47 form a structural unit into which the knife circle, composed for instance of individual segments as described above, is inserted. Any waste that cannot pass through the adjusted knife slits can thus be eliminated through the hollow of the rotating tool structure.

Figure 21:
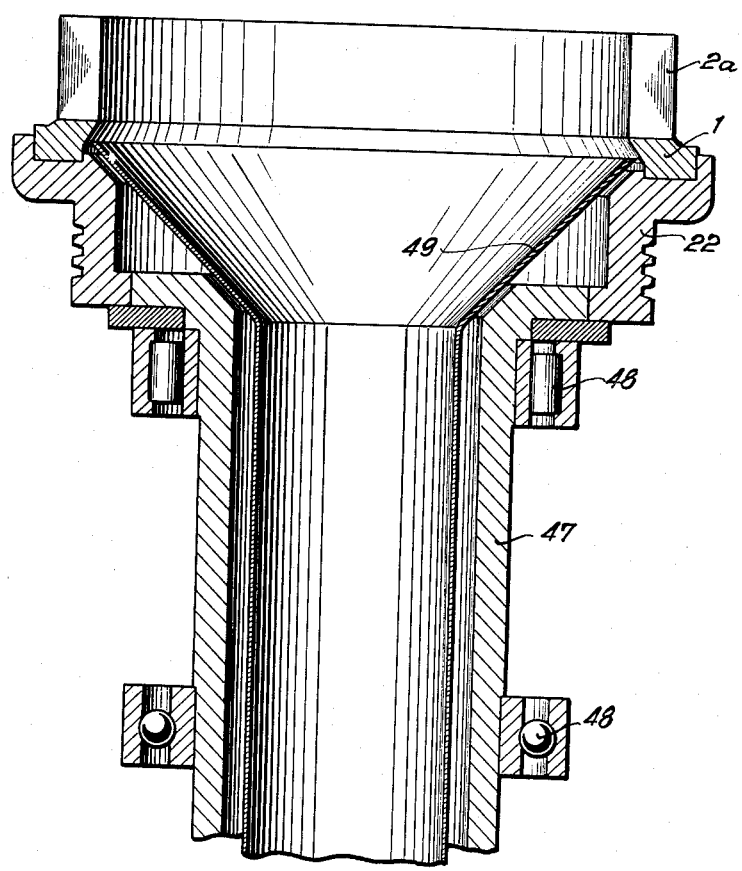
Fig. 21 is a similar axial section of a somewhat modified rotor applicable especially with knives of the kind shown in Fig. 17.

The tool-rotor assembly shown in Fig. 21, if equipped with adjustable knives and knife slits according to Figs. 15 to 17, also affords a separation of peeled shavings of predetermined thickness from all other disintegration products. The tool assembly comprises a knife circle 1, a hollow V-belt sheave 22 and a tubular extension 47 with bearings 48. This assembly may first be considered as an exterior disintegrator. The firmly interconnected parts 1, 22 and 47 are so shaped and have, as shown, such dimensions that a non-rotating wide-throat funnel 49 can be accommodated in the interior of the rotating structure. Only the shredded product, passing through the adjusted knife slits, can enter into the funnel, while any other material, for instance residual material not fastened by the clamping devices, is thrown off by centrifugal force and, as the case may be, may drop into an extension of the housing structure usually surrounding such a tool rotor.

Figure 22:
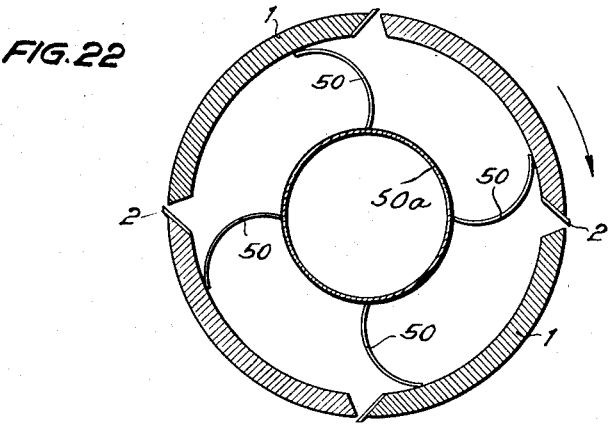
Figs. 22 and 23 show horizontal sections of two different tool rotors respectively, each being applicable with designs otherwise as illustrated in Fig. 21.
Figure 23:
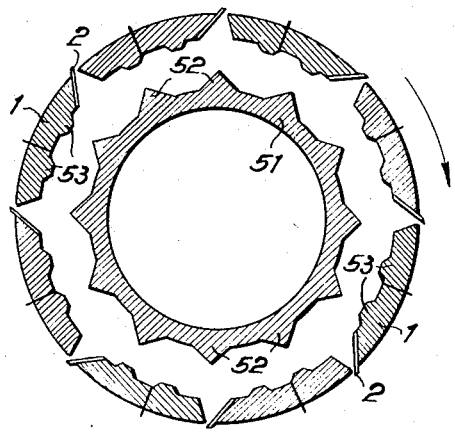

For preventing the shredded product, after entering through the knife slits into the interior of this exterior disintegrator, from being subjected to centrifugal force, that is, for promptly charging this product into the funnel 49, the auxiliary devices shown in Figs. 22 and 23 may be provided.

According to Fig. 22, a number of wipers 50 on a wiper ring 50a are disposed above the funnel. The wiper vanes reach closely to the inner wall of the knife circle 1. According to Fig. 23, a ring 51, disposed above the funnel 49 and attached thereto, is equipped with exterior projections 52, and the knife circle 1 has similar interior projections 53. The disintegrated product collecting between the stationary interior ring and the rotating exterior ring assumes a rolling movement; and the rolling quantity of shavings prevents newly entering shavings from adhering, due to centrifugal force, to the inner wall of the knife circle. At the same time, the entering cross-grained strips of wood are broken into more or less rectangular, longitudinally-grained scales which are as long as the strips were wide.

Figure 24:
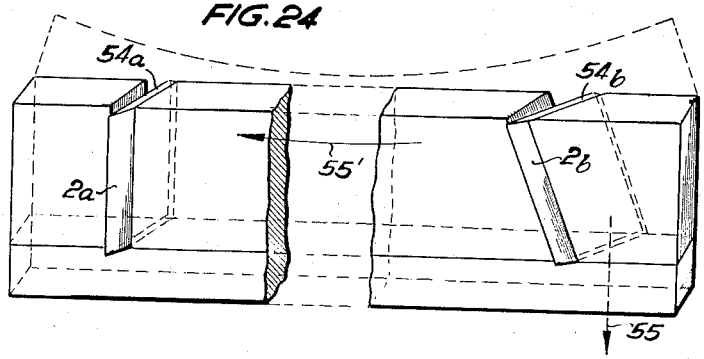
Fig. 24 is explanatory and represents, in diagrammatic perspective, two rotor knives for adzing cut and dragging cut respectively, either form of knives being applicable with any of the embodiments more fully shown in the other figures.

Fig. 24 shows in its left portion a knife 2a inserted as described above, in comparison with a knife 2b, shown in the right portion of the illustration, whose knife edge is inclined rather than parallel to the axis of tool rotation. The edge of knife 2b has a center point located at the same axial height as the corresponding center point of the edge of knife 2a but is turned a moderate angle, for instance approximately 20 to 25°, about a vertical line drawn from the edge center point toward the tool-rotor axis. This produces a sliding cut and causes the peeled shreds to be discharged in the downward direction indicated by an arrow 55, assuming that the top point of the knife edge is leading in the direction of tool rotation indicated by an arrow 55'. The cutting edge of knife 2b, therefore, is longer than the edge of knife 2a for the same cutting width; and the narrow top face 54b of knife 2b is not rectangularly positioned relative to the cutting edge and relative to the broad knife faces, as is the case with the corresponding top face 54a of knife 2a, when the top face 54b is placed flush with the annular top face of the rotor. The inclination of the top face 54b toward the cutting edge and the broad sides of the knife is determined by the magnitude of the cutting angle and the degree of the above-described knife inclination.

As explained, the wood stock in each magazine compartment of a plural-rotor machine according to the invention, such as shown in Figs. 13 and 14, remains clamped fast as it is travelling over any individual tool rotor that may be stopped while the other rotor or rotors continue operating. Thus, the stock is carried over any individual tool rotor as long as that rotor is not in operation. However, since the other rotors are then active to reduce the wood stock, parts of the stock may become so short that they can no longer be seized by the pressure plates 17 and hence are not clamped against the magazine abutment. Such residual wood pieces would not be conveyed over the arrested tool rotor but would drop along the downward step of the slide ring 4 and might then be pressed against the knife circle of the stopped tool by subsequently arriving pieces of similar kind. For that reason, care must be taken in plural-rotor machines to eliminate any such residual wood pieces from the stock before these pieces arrive in front of the knife circle of the arrested tool rotor. The machine shown in Figs. 25 and 26 is equipped with means for automatically effecting such a separation of residual stock pieces.

The machine according to Figs. 25 and 26 is equipped with two exteriorly-operating tool rotors 1a, both in accordance with Fig. 21. The machine has twelve pressure cylinders Z1 to Z12 located above a slide ring 4a in concentric relation to the axis of the magazine in analogy to Fig. 8. The slide ring 4a terminates in the clockwise direction of magazine rotation a distance of about the width of a magazine compartment ahead of each cutting tool, i. e. at the point E. As a result, any residual pieces of wood stock that are too short to be clamped can drop down, together with any splintery pieces or other waste not passing through the knife slits. This may occur in front of rotating knife circles as well as in front of any arrested tools. The shavings, however, enter through the slits into the funnels 49 (Fig. 26) of the disintegrating tools. Hence, all particles collected by the funnels are exclusively of a well defined thickness, length and grain direction since they result only from properly clamped wood rather than from any too short or possibly whirling residual pieces, splinters or the like. Consequently, this machine also operates as a separator or classifier. Such a sorting operation, occurring simultaneous with the production of the shavings, is especially well applicable with exteriorly-cutting tool rotors since then only the shavings peeled in the adjusted thickness from only satisfactory and properly supplied wood can enter into the interior rotor space in immediate succession to the peeling operation, while all other material is thrown off from the exterior of the rotating tools by the action of centrifugal force.

However, if desired, the abovementioned residual pieces of wood stock, too short to be clamped, may also be disintegrated in the same cutting pass. To this end, the slide ring 4a is to be extended at the ends denoted by E by extension pieces which lead toward the next following tool rotor and reach about to point E' (Fig. 25). The shape of the extensions corresponds to that shown by broken lines. According to Fig. 25, there remains between each extension piece and immediately ahead of the next following tool rotor a gap of a few centimeters width for the separation of small size material, while the mentioned residual pieces of wood stock, preferably weighted by wood newly charged into the depleted magazine compartments, are pushed against the knife circles by the shoving action of the wood in the next approaching magazine compartments. Of course, if one of the tool rotors is to be stopped, the extension piece E—E' of the slide ring 4a immediately ahead of that particular tool rotor, seen in the direction of magazine rotation, is to be removed so that the residual pieces during the stopping period drop off in front of the arrested tool while the machine otherwise continues operating.

For clamping and releasing the wood stock to be conveyed over the upward and downward steps 13, 13a, 14 and 14a, the machine illustrated in Figs. 25 and 26 is provided with substantially the same devices as described in the foregoing with reference to Figs. 13 and 14. The cylinders Z1 to Z12 arranged in the inner circle of the magazine, here formed of twelve compartments, are connected by conduits or bores 27a and 28a with a head piece 56 disposed centrally of the magazine and rotating together therewith. The head piece 56 rests upon the distributor head 58 of a stationary control column 57, although it may also form a ring surrounding such a distributor head. Grooves 30a and 31a disposed in the top face of the distributor head 58 are subdivided into segments corresponding to the individual sectors 6, 6a, 33 and 33a of the magazine rotation. The grooves 30a and 31a are connected to the supply and discharge conduits for the pressure medium, as described in detail with reference to Figs. 13 and 14. The above-described further subdivision of the groove segments into the two sectors 33 and 33a, located between the two tool rotors, is also provided, in order to permit passing the wood, if desired, over a tool rotor without disintegrating action.

All supply conduits and also all discharge conduits may be combined in the control column 57, unless the supply and discharge conduits are to be connected to reversing slide valves of the type shown at 37a, 37b, 37c in Fig. 13. If the supply and discharge conduits are to be reversely switched, they extend separately through the control column 57 toward the outside and to reversing slider valves preferably mounted on a control panel in front of or beside the machine beneath the control devices for the drive motors of the corresponding tool rotors.

Fig. 25 shows the pistons and the pressure plates 17 of the individual cylinders at the respective points of magazine rotation in the position occupied at that particular point when the machine operates with both tool rotors running. If during the operation, for instance, the tool unit shown in the left portion of Fig. 25 is to be stopped, the pistons of the cylinders Z4, Z5 and Z6 will first move into clamping position due to the switching of the pressure supply and discharge conduits in the groove segments running clockwise from point 34.

While the above-described means for adjusting the knives to a given thickness of the shreds and the separating means for sorting this product from residue or waste are especially advantageous with exterior shredders, such means are also applicable with interior shredders, particularly if the slide ring 4, where it passes through the interior of the knife circle, is equipped with an opening or gap for the elimination of residual wood pieces and other waste. In that case, such waste is not carried against the interior wall of the knife circle and hence cannot be subjected to cutting. Difficulties may be encountered in such designs as regards accommodating within the available space the means for the transfer from releasing to clamping condition. To minimize such difficulties, the inner diameter of the interiorly-cutting tool rotor is preferably chosen about twice as large as the width of the slide ring for the wood stock. It is then also possible to provide the slide ring with a gap within the knife circle and adjacent to the downward step for the separation of residual pieces, splinters and excessively small products. This design is preferable because, with an interior shredder, the waste must be separated within the knife circle while the shavings of well defined length, thickness or shape are collected outside the knife circle (see also Fig. 28). In contrast, the inner width of the knife circle in an exterior shredder need not be much larger than the width of the slide ring.

Figure 6:
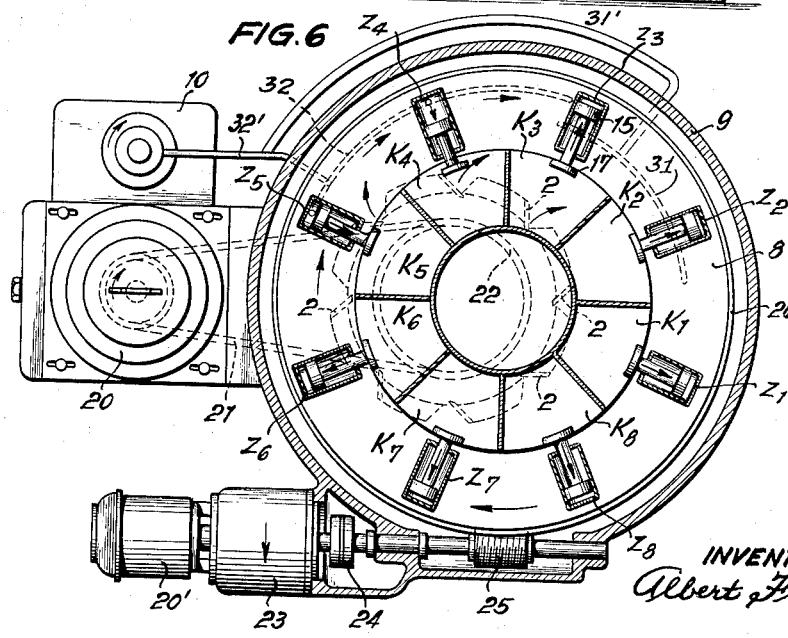

Shown at 62 in Fig. 26 is the worm wheel for rotating the magazine as described with reference to Figs. 5 and 6. Each individual tool rotor is driven by its own motor. The drive motors and the driving transmission for the magazine are preferably placed beside the separate discharge conduits for shavings and waste of the respective tool rotors so that the motors and transmissions lie within the confines of the entire machine tool, i. e. beneath the single slide ring. Thus designed, a machine as shown in Figs. 25 and 26, including all accessories, all bearings and a covering, but exclusive of the control panel or the servicing platform, may be accommodated on a floor space as small as 2.00 by 2.40 meters, while still leaving available a diameter of 2 meters for the twelve-compartment magazine and a diameter of 70 centimeters for each of the two exteriorly-operating knife circles.

For further elucidating the sequence of operations occurring between two tool rotors sequentially adjacent along the circle of magazine rotation, the two tools are shown developed and beside each other in the plane of illustration of Figs. 27 and 28. Fig. 11 relates to a machine of the exterior type, and Fig. 12 relates to a machine with interior shredders. The stock to be shredded slides in the direction of the arrow 61 from the left toward the right over the slide ring 4a or 4. The upward and downward steps of the slide rings are clearly apparent, as well as the bridgeable gap ahead of the next following shredding operation, if such a gap is provided. The sectors 6a, 6 and 33, 33a are the same as indicated in Figs. 13 and 25. Numeral 34 in Fig. 28 denotes the place of subdivision of the groove segments in the transition sector 33 between the two tool rotors for conveying the stock over a tool rotor that may be stopped (see Fig. 13). A single complete cycle of all functions from one tool circle axis to the other (double-headed arrow 59 or 60), therefore, extends in machines two, three, four or more tool rotors over corresponding circular arcs 180°, 120°, 90°, and so forth.

Generally, each arc between two tool rotors (from center to center, corresponding to arrow 59 or 60) should provide space for six magazine compartments to avoid difficulties in obtaining the proper sequence of operations. Consequently, the magazine of a machine with two, three or four tool rotors is preferably subdivided into twelve, eighteen and twenty-four compartments, respectively.

For further predetermining the size or shape of the shavings, the tool rotors may be equipped with conventional pre-slitters, such as rotating rollers or drums provided with scoring elements. Due to the pre-scoring, the shavings are accurately predetermined not only as to their length, thickness and width, but also as regards the particle shape which may be square, rhomboidal, rectangular, circular or rounded. The pre-slitters or scoring elements are preferably always mounted near the upper ends of the cutting edges for facilitating the separation of the shavings from the stock. The pre-scoring makes it possible to simultaneously produce with a single shredding machine as many kinds of shavings, differing in shape and/or thickness, as are tool rotors built into the machine. For instance, a machine with three tool rotors permits producing two different kinds of shavings in continuous operation for any desired period of time. To this end, the knives, pre-slitters or any other elements that determine the shape or size of the shavings, may always be inserted into a rotor temporarily stopped for knife exchange, in the same manner as these elements are present in the tool rotor next to be stopped for knife replacement.

If the tool rotors are not driven by belts but are directly coupled with a motor by a shaft (see, for instance, Fig. 11), then the bottom of the cup-disc rotor may be designed as a spoke wheel. In an interior shredder, the spacing between the spokes may then be kept sufficiently large to let the unclamped residual pieces of stock drop through the gaps.

It will be understood that the different designs and embodiments of the various machine components may be applied in a variety of different combinations, depending upon the requirements or desiderata of the particular manufacturing conditions to be satisfied. Plural-rotor machines, in particular, are well suitable for continuous day and night operation not requiring any stoppage of the flow of material for knife replacement. The machines, as described, can also be made to simultaneously perform a sorting and dosing operation so that the desired uniform particles are separated from all other material and may be directly passed as a uniform flow per time unit into a continuous course of subsequent fabrication, thus obviating the conventional sorting apparatus and intermediate storage bins heretofore customary in wood-composition manufacturing plants.

It will be apparent to those skilled in the art upon a study of this disclosure that my invention permits of various modification and may readily be embodied in machine designs other than those here specifically illustrated and described, without departing from the gist and essential features of my invention and within the scope of the claims annexed hereto.

I claim:

1. A wood shredding machine, comprising a rotary magazine having a vertical axis of rotation and having an annular group of peripherally sequential and vertically elongated compartments upwardly and peripherally open for the reception of wood to be shredded, and a tool rotor having knives with upwardly directed cutting edges mounted along the rotor periphery, said rotor having a knife-edge circle of a diameter larger than the radial width of said annular group of compartments and being disposed beneath and adjacent to said magazine and having a vertical axis of rotation eccentric to that of said magazine.

2. A wood shredding machine, comprising a rotary magazine having a vertical axis of rotation and having peripherally sequential and vertical compartments for the reception of wood to be shredded, a tool rotor having knives with upwardly directed cutting edges mounted along the rotor periphery, said rotor being disposed beneath and adjacent to said magazine and having a vertical axis of rotation eccentric to that of said magazine, said rotor being in sequential cutting relation to said compartments over a given range of magazine rotation, and a stationary slide-way structure having a horizontal top surface concentric to said magazine and extending beneath said compartments to form a stationary bottom thereof, said top surface extending outside of said range at a height above said knives, and said structure having a downwardly inclined ramp portion extending within said range from said top surface to below the top points of said knives, and said structure having a gap located at the low-end side of said ramp portion and traversed by said knives.

3. A wood shredding machine, comprising a rotary magazine having a vertical axis of rotation and having an annular group of peripherally sequential and vertically elongated compartments upwardly, downwardly and peripherally open for the reception of wood to be shredded, a tool rotor having knives with upwardly directed cutting edges mounted along the rotor periphery, said rotor having a knife-edge circle of a diameter larger than the radial width of said annular group of compartments and being disposed beneath and adjacent to said magazine and having a vertical axis of rotation eccentric to that of said magazine so that said knives are cuttingly engageable with the wood over a given range of magazine rotation, and a stationary slide-way structure having a ring-shaped horizontal top surface concentric to said magazine and extending beneath said compartments to form a stationary bottom thereof, said top surface extending outside of said range at a height above said knives, and said structure having a downwardly inclined ramp portion extending within said range from said top surface to below the top points of said knives, and said structure having a gap located at the low-end side of said ramp portion and traversed by said knives.

4. A wood shredding machine according to claim 2, comprising clamping devices radially adjacent to said respective magazine compartments, each of said clamping devices having pressure cylinder means and pressure control means connected with said cylinder means and responsive to magazine rotation for controlling said devices to temporarily clamp the wood within said range of magazine rotation.

5. A wood shredding machine according to claim 2, comprising clamping devices radially adjacent to said respective magazine compartments, each of said clamping devices having a radially movable buffer member and spring means biasing said buffer member to a given position, pressure cylinder means connected with said buffer member for moving it to another position, and pressure conduit means connected with said cylinder means and responsive to magazine rotation for controlling said devices to temporarily clamp the wood within said range of magazine rotation.

6. A wood shredding machine according to claim 2, comprising a rotatable ring member concentric to said magazine and firmly joined therewith near the lower end thereof, said ring member having gear teeth on its periphery, a drive motor and a transmission connected with said motor and having a gear meshing with said gear teeth, and clamping devices having pressure cylinders firmly mounted on said ring member radially adjacent to said respective compartments, and pressure control means responsive to rotation of said ring member and connected with said cylinders for controlling said respective devices to temporarily clamp the wood within said range of magazine rotation.

7. A wood shredding machine according to claim 2, comprising a rotatable ring member concentric to said magazine and firmly joined therewith near the lower end thereof, clamping devices having pressure cylinders firmly mounted on said ring member radially adjacent to said respective compartments, said ring member having supply and discharge ducts communicating with said respective cylinders, a stationary ring body concentric to said ring member and in face-to-face sliding engagement therewith, said body having supply and discharge ducts for pressure medium in registry with said respective ducts for each cylinder on said ring member when said cylinder passes through said range, whereby said devices are controlled to temporarily clamp the wood within said range of magazine rotation.

8. A wood shredding machine according to claim 2, comprising a rotatable ring member concentric to said magazine and firmly joined therewith near the lower end thereof, said ring member having a peripheral portion forming a worm-gear wheel, a drive motor and a transmission connected with said motor and having a worm meshing with said wheel, clamping devices having pressure cylinders firmly mounted on said ring member radially adjacent to said respective compartments, said ring member having pressure-medium ducts connecting with each of said cylinders and having respective port openings in said peripheral portion, a stationary ring body concentric to said ring member and in face-to-face sliding engagement with said peripheral portion, said body having pressure-medium supply and discharge channels registering with said respective port openings for each of said cylinders when said cylinder passes through said range, whereby said devices are controlled to temporarily clamp the wood within said range of magazine rotation.

9. A wood shredding machine according to claim 2, comprising a rotatable ring member concentric to said magazine and firmly joined therewith near the lower end thereof, clamping devices having pressure cylinders firmly mounted on said ring member radially adjacent to said respective compartments, said ring member having supply and discharge ducts communicating with said respective cylinders, a stationary ring body concentric to said ring member and in face-to-face sliding engagement therewith, said body having supply and discharge ducts for pressure medium in registry with said respective ducts for each cylinder on said ring member when said cylinder passes through said range, whereby said devices are controlled to temporarily clamp the wood within said range of magazine rotation, and a stationary cover structure forming a horizontal working platform around said magazine and having an annular housing portion enclosing said clamping devices and said ring member.

10. A wood shredding machine, comprising a rotary magazine having a vertical axis of rotation and having peripherally sequential and vertical compartments for the reception of wood to be shreaded, a plurality of tool rotors having respective vertical axes of rotation eccentric to said magazine and being spaced from each other along a circle of magazine rotation, each of said rotors having knives with upwardly directed cutting edges mounted along the rotor periphery, each rotor being disposed beneath said compartment in sequential cutting relation to said compartments over a given range of magazine rotation spaced from the corresponding range of the adjacent tool rotor, and a stationary slide-way structure having a substantially horizontal top surface concentric to said magazine and extending beneath said compartments to form a stationary bottom thereof, said top surface extending outside of said ranges at a height above said knives, and said structure having a downwardly inclined ramp portion extending within each of said ranges from said top surface to below the top points of said knives, and said structure having a gap located at the low-end side of each of said respective ramp portions and traversed by said knives of said respective rotors.

11. A wood shredding machine according to claim 10, comprising clamping devices adjacent to, and near the bottom side of, said respective compartments for fastening the wood stock in said compartments, and control means connected with said devices and responsive to magazine rotation for causing said devices to temporarily clamp the stock within each of said respective ranges of magazine rotation.

12. A wood shredding machine according to claim 10, comprising pressure-responsive clamping devices disposed adjacent to the bottom side of said respective magazine for controllably fastening the wood stock in said compartments, said devices being mounted together with said magazine to rotate together therewith and having each a pair of pressure ducts for clamping and release respectively, a stationary structure concentric to said magazine and having pairs of pressure passages for clamping and release respectively, said passages communicating with said respective ducts of each of said devices during rotation of said magazine to selectively control each device to clamp the stock within each shredding range of said respective rotors and to release the stock during travel ranges outside said shredding ranges, said passages extending concentric to the magazine and one of said passages being located at the inside of the other within rotary ranges corresponding to said shredding ranges but being otherwise located at the outside of the other passage.

13. A wood shredding machine according to claim 10, comprising pressure-responsive clamping devices disposed adjacent to the bottom side of said respective magazine for controllably fastening the wood stock in said compartments, said devices being mounted together with said magazine to rotate together therewith and having each a pair of pressure ducts for clamping and release respectively, a stationary structure concentric to said magazine and having pairs of pressure passages for clamping and release respectively, said passages communicating with said respective ducts of each of said devices during rotation of said magazine, and pressure supply means connected with said pairs of passages and having pressure-reversing valve means for selectively controlling said devices to clamp and release respectively the stock within the range of said respective tool rotors to permit passing the stock in lifted and clamped position over a selected tool rotor.

14. A wood shredding machine according to claim 10, comprising pressure-responsive clamping devices disposed adjacent to the bottom side of said respective magazine for controllably fastening the wood stock in said compartments, said devices being mounted together with said magazine to rotate together therewith and having each a pair of pressure ducts for clamping and release respectively, a stationary structure concentric to said magazine and having pairs of pressure passages for clamping and release respectively, said passages communicating with said respective ducts of each of said devices during rotation of said magazine, a first one of said pairs of passages being disposed in correlation to the shredding range of each of said tool rotors, a second pair of said passages being disposed in correlation to each range of magazine rotation extending from a tool rotor to shortly ahead of the next following ramp portion of said slide structure, and a third pair of said passages extending from shortly ahead of said ramp portion to beyond the next following gap of said slide structure, pressure-medium conduit means connected to each of said passage pairs and having a pressure direction corresponding to clamp-releasing operation of said first pairs and clamp-setting operation of said second pairs, and reversing valve means interposed between said conduit means and each of said third pairs for selectively setting the pressure direction in each third pair of passages for clamp-setting and clamp-releasing operation respectively.

15. A wood shredding machine according to claim 10, comprising clamping devices adjacent to said respective magazine compartments, control means operatively connected with said devices for controlling them, said gap of said ring structure having in the peripheral direction a length sufficient for unclamped residual stock to drop off said ring structure shortly ahead of said knives.

16. A wood shredding machine, comprising a rotary magazine having a vertical axis of rotation and having peripherally sequential and vertical compartments for the reception of wood to be shredded, and a tool rotor having a central opening and knives with upwardly directed cutting edges mounted about said opening along the rotor periphery, said rotor being disposed beneath and adjacent to said magazine and having a vertical axis of rotation eccentric to that of said magazine so that said knives are cuttingly engageable with the wood over a given range of magazine rotation, said rotor having adjustable slits adjacent to said respective cutting edges, through which the shredded material may pass from one to the other of the rotor periphery, a stationary funnel disposed in said opening for discharging the shredded material, and baffle elements disposed on said funnel and projecting toward the inner periphery of said rotor to prevent continuous rotation of the shredded material.

References Cited in the file of this patent

UNITED STATES PATENTS

| | | |
|---|---|---|
| 467,786 | Wigger | Jan. 26, 1892 |
| 785,986 | Traxler | Mar. 28, 1905 |
| 1,259,125 | Parker | Mar. 12, 1918 |
| 2,004,367 | Brown | June 11, 1935 |
| 2,349,034 | Elmendorf | May 16, 1944 |
| 2,617,454 | Booth | Nov. 11, 1952 |
| 2,620,138 | Vazieuz | Dec. 2, 1952 |

FOREIGN PATENTS

| | | |
|---|---|---|
| 382,832 | Great Britain | Nov. 3, 1932 |